United States Patent
Seminel (10) Patent No.: US 11,233,444 B2
(45) Date of Patent: Jan. 25, 2022

(54) ELECTRIC MOTOR FOR A PROPELLER ENGINE

(71) Applicant: Ratier-Figeac SAS, Figeac (FR)

(72) Inventor: Bruno Seminel, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 214 days.

(21) Appl. No.: 16/712,068

(22) Filed: Dec. 12, 2019

(65) Prior Publication Data

US 2021/0075303 A1     Mar. 11, 2021

(30) Foreign Application Priority Data

Sep. 10, 2019    (EP) ..................................... 19306088

(51) Int. Cl.
    *H02K 21/12*      (2006.01)
    *B64C 11/00*      (2006.01)
    (Continued)

(52) U.S. Cl.
     CPC .............. *H02K 21/12* (2013.01); *B64C 11/00* (2013.01); *B64D 27/24* (2013.01); *H02K 1/14* (2013.01);
    (Continued)

(58) Field of Classification Search
     CPC .......... H02K 21/12; H02K 11/33; H02K 1/14; H02K 1/17; H02K 1/27; H02K 11/0094;
    (Continued)

(56) References Cited

U.S. PATENT DOCUMENTS

| 5,747,909 A | * | 5/1998 | Syverson | H02H 7/06 310/114 |
| 5,747,971 A | * | 5/1998 | Rozman | H02P 9/02 318/801 |

(Continued)

FOREIGN PATENT DOCUMENTS

| DE | 102008019644 A1 | 10/2009 |
| EP | 2919555 A1 | 9/2015 |

OTHER PUBLICATIONS

Lee, "Design of an Improved Type Rotary Inductive Coupling Structure for Rotatable Contactless Power Transfer System", MATEC Web of Conferences, Jan. 2015.*

(Continued)

*Primary Examiner* — John K Kim
(74) *Attorney, Agent, or Firm* — Cantor Colburn LLP (57) ABSTRACT

There is provided a system comprising a brushless DC ("BLDC") electric motor for a propeller engine and a motor controller. The motor comprises a rotor including one or more permanent magnets and one or more alternator windings, and a stator including one or more stator windings. The controller is configured to apply a first, transient DC voltage to the windings of the stator, wherein the first, transient DC voltage is configured to provide commutation switching for the windings of the stator so as to generate a torque on the rotor. The controller is further configured to apply a second, static DC voltage to the windings of the stator, wherein the second, static DC voltage is configured to induce an electric current in the alternator windings so as to generate an AC voltage in the alternator windings.

14 Claims, 4 Drawing Sheets

(51) Int. Cl.
  *H02K 1/14* (2006.01)
  *H02K 1/17* (2006.01)
  *H02K 1/27* (2006.01)
  *H02K 11/00* (2016.01)
  *H02K 11/33* (2016.01)
  *H02K 16/04* (2006.01)
  *B64D 27/24* (2006.01)

(52) U.S. Cl.
  CPC ............... *H02K 1/17* (2013.01); *H02K 1/27* (2013.01); *H02K 11/0094* (2013.01); *H02K 11/33* (2016.01); *H02K 16/04* (2013.01)

(58) Field of Classification Search
  CPC .......... H02K 16/04; H02K 15/03; H02K 1/12; H02K 1/2786; B64C 11/00; B64C 2201/042; B64C 11/44; B64C 19/02; B64C 27/28; B64D 27/24; B64D 15/12; Y02T 50/40; Y02T 50/60; H02P 6/14; H01F 38/18
  USPC ........................................................ 310/40 R
  See application file for complete search history.

(56) References Cited

U.S. PATENT DOCUMENTS

| | | | |
|---|---|---|---|
| 6,236,134 B1* | 5/2001 | Syverson | H02K 1/2773 310/181 |
| 7,508,086 B2* | 3/2009 | Huang | F02N 11/04 290/31 |
| 8,102,143 B2* | 1/2012 | Weigel | H02P 9/007 318/801 |
| 9,638,044 B2* | 5/2017 | Gieras | F01D 5/18 |
| 9,975,644 B1 | 5/2018 | Kimchi et al. | |
| 2007/0194572 A1* | 8/2007 | Xu | H02K 19/12 290/31 |
| 2008/0093850 A1* | 4/2008 | Taneja | H02K 1/32 290/36 R |
| 2009/0085505 A1 | 4/2009 | Weigel | |
| 2017/0066531 A1 | 3/2017 | Mcadoo | |
| 2018/0019646 A1 | 1/2018 | Quick et al. | |
| 2018/0194484 A1 | 7/2018 | Livierators et al. | |
| 2021/0075303 A1* | 3/2021 | Seminel | B64D 15/12 |

OTHER PUBLICATIONS

European Search Report for Application No. 19306088.6, dated Feb. 14, 2020, 5 pages.

* cited by examiner

ELECTRIC MOTOR FOR A PROPELLER ENGINE

FOREIGN PRIORITY

This application claims priority to European Patent Application No. 19306088.6 filed Sep. 10, 2019, the entire contents of which is incorporated herein by reference.

FIELD

The present disclosure relates generally to an electric motor for an aircraft propeller.

BACKGROUND

Electric (e.g., DC) motors are configured to convert an electric current (electrical energy) into mechanical energy, by passing the current through one or more windings that each generate a magnetic field. One or more permanent magnets are used to produce one or more secondary magnetic fields, and a reciprocating force is generated in between the windings on one side and the magnets on the other due to the interaction between the magnetic fields.

A mechanical arrangement of commutators may be used to energise the windings in the armature of a DC motor. However, it is becoming more common to replace such mechanical commutators using an electrical mechanism (so called brushless DC motors or BLDC). Although typically the permanent magnets form part of the stator of a motor (and the windings part of the rotor), in electrical commutation the windings may form part of the stator and the permanent magnets may form part of the rotor. The stationary windings can be configured to move the permanent magnets (and the rotor) by being energised in a controlled sequence to produce a rotating magnetic field.

Figure 1:
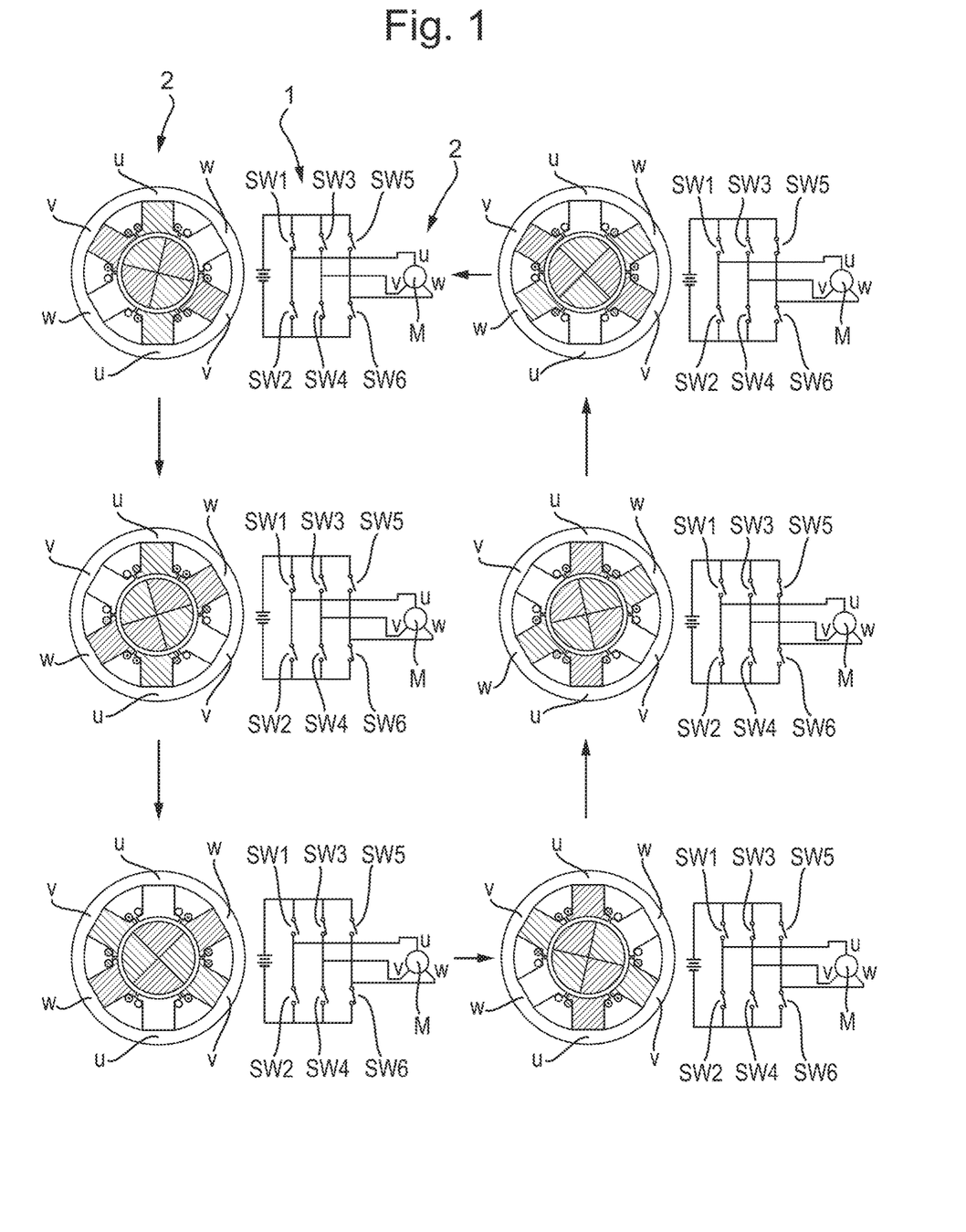
FIG. 1 shows a commutation sequence of a conventional brushless DC electric motor.

One typical sequence is illustrated in FIG. 1, and may be referred to as a trapezoidal control scheme, in which the stationary windings may be energised in a particular sequence to drive the motor. A three-phase brushless DC motor 2 (shown schematically and electrically) is driven in an anticlockwise direction by a motor controller 1 (which may be a MOSFET bridge), wherein for each step in the commutation sequence, one of the windings (either "U", "V" or "W") is driven high by the controller 1, while the other is driven low and the third is left floating. For example, in the top left diagram, winding U is high (forming an N pole), winding V is low (forming a S pole) and winding W is floating. The resulting magnetic field is configured to move the rotor anticlockwise since its permanent magnets will be repelled by one winding and attracted by the next. The subsequent stage (below) shows winding U remaining high while winding the switches to floating, and winding W switches low. This can be seen as maintaining the rotation of the magnetic field and moving rotor. The remaining commutation steps follow a similar sequence.

Various other arrangements of electric brushless DC motors are available, and are known in the art, for example sinusoidal or field-oriented control. In a sinusoidal control, all three windings may remain energised with the driving current in each of them following a sinusoidal profile at 120 degrees from each other. Field-oriented control relies on measuring and adjusting estate occurrence so that the angle between the rotor and stator flux is always 90 degrees. Various sensors, for example Hall-effect sensors, may be used by the motor controller (e.g., motor controller 1 of FIG. 1) in each case to determine the position of the rotor relative to the stator, which can be used to determine a switching point or variance of the current as the rotor rotates. In addition, pulse width modulation may be used to convert an input DC voltage into a modulated driving voltage. Such techniques are known in the art and will not be described in more detail herein.

Medium-sized propeller aircraft are typically equipped with a single power plant on each wing, wherein the propellers used on such aircraft are typically variable pitch to allow operation at a substantially constant predetermined RPM and in addition to allow a generation of reverse thrust or feather the propeller to reduce windmilling drag and prevent any risk of overspeed. On existing aircraft the variation of pitch may be achieved using an electro-hydromechanic system. The power required by such systems may be about 1-4% of the total power output of each power plant.

Modern propellers may additionally include a blade deicing system, which can include a heater in the form of a resistive element that covers or extends along the bottom part of the trailing edge of the propeller blade. Such heaters typically require a three-phase AC or single phase DC electrical power supply, and typically require about 1-4% of the total power output of each power plant.

Both the variable pitch mechanism and the deicing mechanism for the propeller blades require installation of various components on the rotating propeller, leading to the need to transfer electric or hydraulic power from the static side of the power plant or aircraft to the rotating propeller. Electrical power transfer can be achieved using brush contacts and slip ring mechanisms, which may have high weight or cost drawbacks and also involve wear over time. Hydraulic power transmission can be achieved using transfer bearings, which also involve high weight or cost drawbacks, as well as introducing potential leakage problems.

The recent trends in propulsion systems for aircraft include a desire to incorporate, wherever possible, electric propulsion as part (or the entirety) of an engine power plant on the aircraft. This has led to various considerations of how to adapt existing variable pitch, deicing and other systems for use with electric propulsion mechanisms, and the technology disclosed herein is aimed at addressing such considerations.

SUMMARY

In an aspect of the disclosure there is provided a system comprising a brushless DC ("BLDC") electric motor for a propeller engine (and/or for driving a plurality of propellers), and a motor controller. The motor comprises a rotor, which may be configured to rotate about an axis, wherein the rotor includes one or more permanent magnets and one or more alternator windings, and the motor further comprises a stator including one or more stator windings. The controller is configured to apply a first, transient DC voltage to the windings of the stator, wherein the first, transient DC voltage is configured to provide commutation switching for the windings of the stator so as to generate a torque on the rotor via the permanent magnets. The controller is further configured to apply a second, static DC voltage to the windings of the stator, wherein the second, static DC voltage is configured to induce an electric current in the alternator windings so as to generate an AC voltage in the alternator windings.

The above arrangement beneficially avoids the need for a slip ring assembly between the static and rotating portions of the motor (or propeller engine), lowering complexity, weight and cost. In addition a single motor (and, also importantly, single controller) can be used to provide rotational drive to the propellers of the propeller engine, and generate electric power on the rotating side of the engine to power variable pitch, deicing and other systems on the rotating side. Due to this the technology disclosed herein may be particularly suitable for a direct drive propeller engine, in which the electric motor directly drives the rotating portion of the engine (i.e., without use of a gear assembly) and aspects relate to a direct drive propeller engine comprising the system described above.

The term "propeller engine" is intended to refer to the engine assembly as a whole, e.g., including propellers, propeller hub, driving means (in this case an electric motor) and various other components. The term "propeller engine assembly" could be used interchangeably with this term.

Also, one important characteristic of the system is that it allows installation of the motor controller on the static portion (aircraft side), which can avoid high G-field constraints associated with installation on the rotating portion (i.e., with the propellers). This also allows an easy electrical connection to the aircraft electrical network and other aircraft systems like flight control computers, etc.

In accordance with any of the aspects and embodiments described herein, the alternator windings and/or permanent magnets may be distributed around a circumference of the rotor and may rotate about a common axis (e.g., the rotational axis of the rotor referred to above).

The stator may comprise a hub (or shaft) and magnetic elements may extend from the hub (e.g., in pairs having an opposing relationship). The stator windings may be wound around each magnetic element. Each magnetic element may extend from the hub in an opposing direction to another (e.g., opposing) magnetic element.

The permanent magnets may comprise alternating north and south poles located around the circumference of the rotor.

The alternator windings may be located circumferentially between two (or more) of the permanent magnets of the rotor. This can provide a compact assembly and optimise the electrical arrangement of the alternator windings and permanent magnets. Alternatively, the alternator windings may be located concentrically within the permanent magnets of the rotor, so that the permanent magnets form a cylindrical assembly located at a first radial position, while the alternator windings are located within (or outside) the cylindrical assembly of the permanent magnets at a second radial position. In other embodiments the permanent magnets and the alternator may be axially displaced.

In accordance with any of the aspects and embodiments described herein, the system may further comprise one or more position sensors configured to produce signals indicative of the position of the permanent magnets and/or the alternator windings. The controller may be configured to receive the signals from the position sensors and process these signals to determine the relative positions of the stator windings and the permanent magnets and/or the alternator windings. The controller may be configured to use the relative positions determined from the signals to provide the commutation switching for the windings of the stator and generate a torque on the rotor as aforesaid.

In an aspect there is provided a propeller engine comprising a system as described in any of the aspects and embodiments described above, wherein the motor is configured to drive the propellers of the propeller engine. The propellers may be driven directly by the motor, for example without the use of a gear assembly and/or reduction transmission and/or transmission shaft. In this case, the stator can advantageously be installed directly in the propeller hub and the stator directly attached to the aircraft structure thus reducing the number of components (and weight and cost).

The controller may be configured to control the rotational speed of the propeller (e.g., one or more propellers thereof) as well as the electrical power supplied by the alternator. Both the rotational speed and the electrical power may be varied by the controller, for example based on engine thrust requirements and electrical power requirements respectively. The controller may receive engine thrust requirements from an external device, such as a command signal from an engine management system (e.g., controlled by an operator or pilot). The controller may determine electrical power requirements from a feedback mechanism of an electrically powered system that is powered by the alternator (e.g., one or more of the electrically powered systems described below and elsewhere herein). The controller may be configured to regulate the first, static DC voltage supplied to the alternator coils. The controller may determine a demand for electrical power from the alternator, optionally using one or more sensors configured to produce signals representative of the AC or DC current and/or voltage produced by the alternator. The controller may regulate the first, static DC voltage supplied to the alternator coils based on the determined demand.

The engine may further comprise a rotating portion comprising the rotor and a plurality of propellers, and a non-rotating portion comprising the stator, wherein the rotating portion of the engine may further comprise one or more electrically powered systems. The one or more electrically powered systems may comprise one or more of a system for varying a pitch of the propellers and/or system for deicing the propellers.

The engine may further comprise a magnetic coupling between the static portion and the non-rotating portion, wherein the magnetic coupling is configured to communicate one or more signals between the static portion and the non-rotating portion. The controller may be configured to send and receive signals via the magnetic coupling to the one or more electrically powered systems that are located on the non-rotating portion. Similarly, the one or more electrically powered systems may be configured to send and receive signals via the magnetic coupling to the controller. The controller and the one or more electrically powered systems may communicate via the magnetic coupling. The magnetic coupling may comprise the existing components of the assembly, such as the stator windings and alternator windings.

In a mode of operation the controller may be further configured to generate electrical power in the alternator windings by applying an AC voltage on the stator windings, but without commutation switching or other variability that would drive the rotor for rotation. This mode of operation can be useful in order to change the pitch on the propellers if the rotor is not rotating, such as when the aircraft is grounded.

In an aspect there is provided an aircraft comprising a propulsion system including one or more propeller engines, wherein at least one of which is (or all of them are) a propeller engine as described in any of the aspects and embodiments described above.

In an aspect there is provided an unmanned aerial vehicle ("UAV") comprising a propulsion system including one or more propeller engines, wherein at least one of which is (or all of them are) a propeller engine as described in any of the aspects and embodiments described above.

BRIEF DESCRIPTION OF THE DRAWINGS

Various embodiments will now be described, by way of example only, and with reference to the accompanying drawings in which.

DETAILED DESCRIPTION

Herewith will be described various embodiments of an electric motor or machine for an aircraft (which may be otherwise referred to herein as an aeroplane). The aircraft may be of the type that is propelled (e.g., in any direction, including forward, backwards, up, down, sideways) by thrust from one or more propeller engines (e.g., fixed or rotary wing), and the electric motor may be configured to drive one of the propeller engines. In various embodiments, each propeller engine may be configured to be driven by one such electric motor.

The aircraft may be of any suitable size, shape, and wing configuration. The aircraft may be for one or more of recreation, transportation of goods and/or people, military, and research. The aircraft may be one that is flown by a pilot on board the aircraft, or alternatively may be an unmanned aerial vehicle ("UAV") that can be remotely or computer-controlled, for example a drone. A vertical lift propulsion system may benefit from a propeller engine as disclosed herein, and aspects of the disclosure may relate to a vertical lift propulsion system comprising a propeller engine and electric motor as described herein.

The technology disclosed herein may be particularly suitable for unmanned aerial vehicles and/or propeller driven aircraft. In particular, aircraft that are driven by one or more propeller assemblies, wherein electrically powered and/or electro-mechanical systems are located on the rotating portion of the propeller assemblies, can benefit from the technology disclosed herein, such as variable pitch and/or deicing systems or any other electrical system.

The electric motor described herein is intended to combine a brushless direct current ("BLDC") electric motor and an alternator in a common assembly for driving a propeller of an aircraft.

Figure 2:
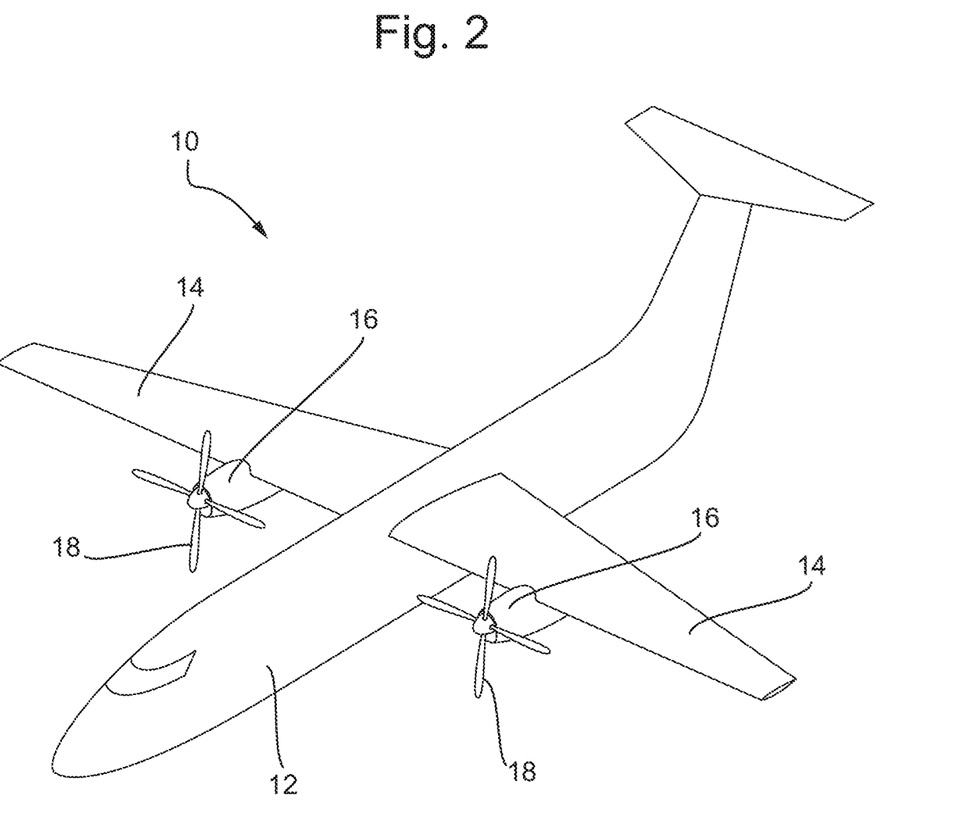
FIG. 2 shows an aircraft having twin propeller engines in accordance with various embodiments of the present disclosure.

FIG. 2 shows an aircraft 10 that comprises a fuselage 12 and a pair of fixed wings 14 extending from the fuselage 12. Located on each wing is a propeller engine 16, each of which is configured to drive a propeller assembly that comprises a multiple of propellers 18.

Figure 3:
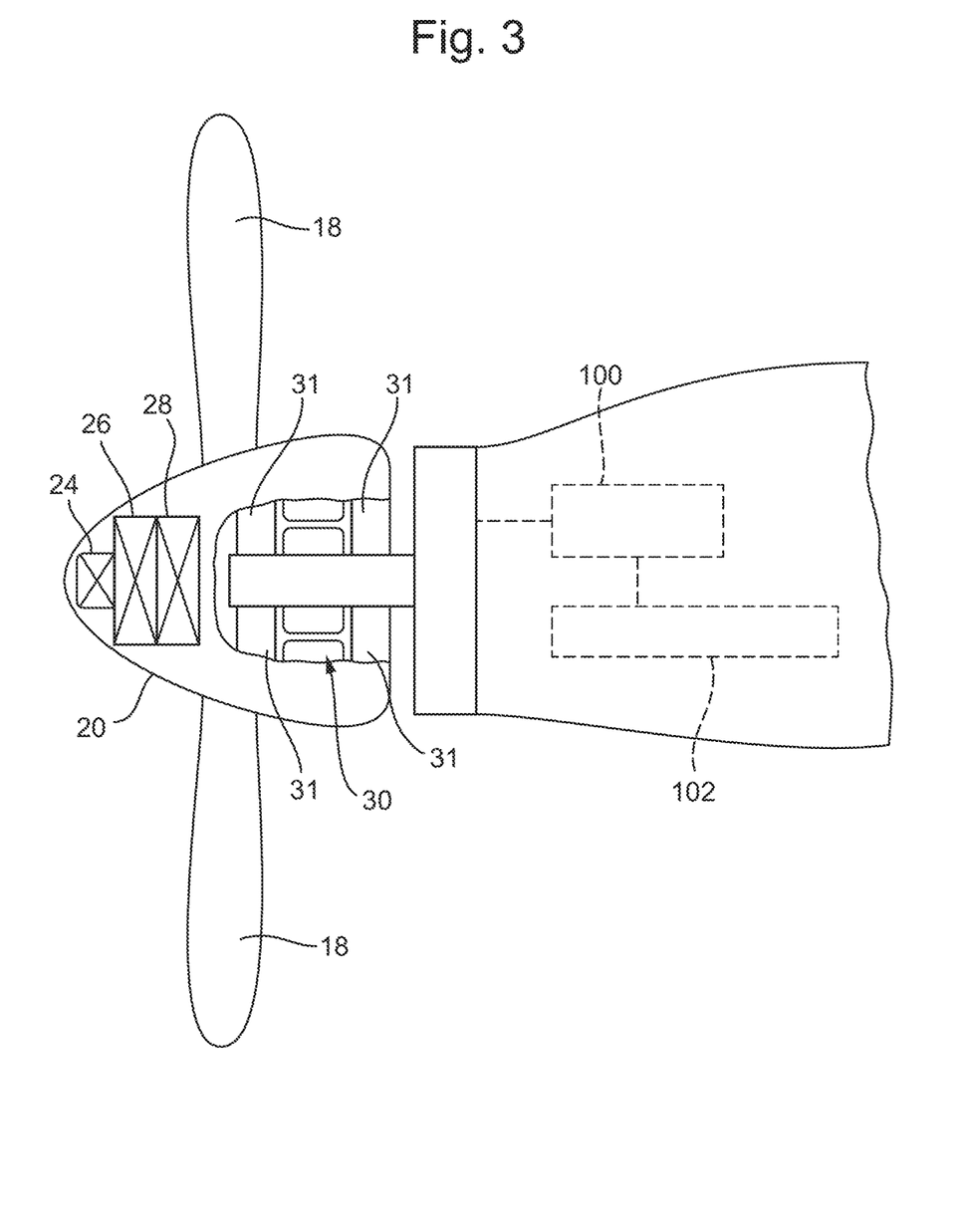
FIG. 3 shows a propeller engine in accordance with various embodiments of the present disclosure, which may be used with the aircraft of FIG. 2.

FIG. 3 shows the propeller engine 16 in isolation and schematically, from which it can be seen the propellers 18 extend from a rotating propeller hub 20. The engine 16 comprises an electric motor 30 configured to rotate the propellers 18 to provide thrust for the aircraft 10. Although there may be a drive shaft between the electric motor 30 and propellers 18, in various embodiments the motor 30 is installed in the propeller hub 20 to remove the need for this additional assembly. One or more bearings 31 or bearing systems may be provided to allow rotation of the propeller hub 20 (and other rotating portions of the engine) with respect to the static portions of the engine 16.

The engine 16 may further comprise a motor controller 100 (e.g., processor or circuitry) configured to control operation of the electric motor 30. Although the controller 100 is shown as being incorporated within the engine 16 in FIG. 3, this may not be the case and the controller 100 could be incorporated remotely, for example as part of an engine management system of the aircraft 10. The engine management system may be located anywhere on the aircraft 10, for example in the cockpit, or even (e.g., in the case of an unmanned aerial vehicle) remotely from the aircraft.

The broadest aspects of the present disclosure may relate to a system comprising the brushless DC ("BLDC") electric motor 30 and the controller 100.

The engine 16 may further comprise one or more electric power sources 102, for example one or more batteries, fuel cells, or an Auxiliary Power Unit using a thermal engine, etc.

The engine 16 may further comprise one or more electrically powered systems 24 located on a rotating portion of the propeller assembly, e.g., within the propeller hub 20. The one or more electrically powered systems 24 may comprise one or more of a system 26 for varying a pitch of the propellers 18 and/or system 28 for deicing the propellers and/or any other system 18.

Figure 4:
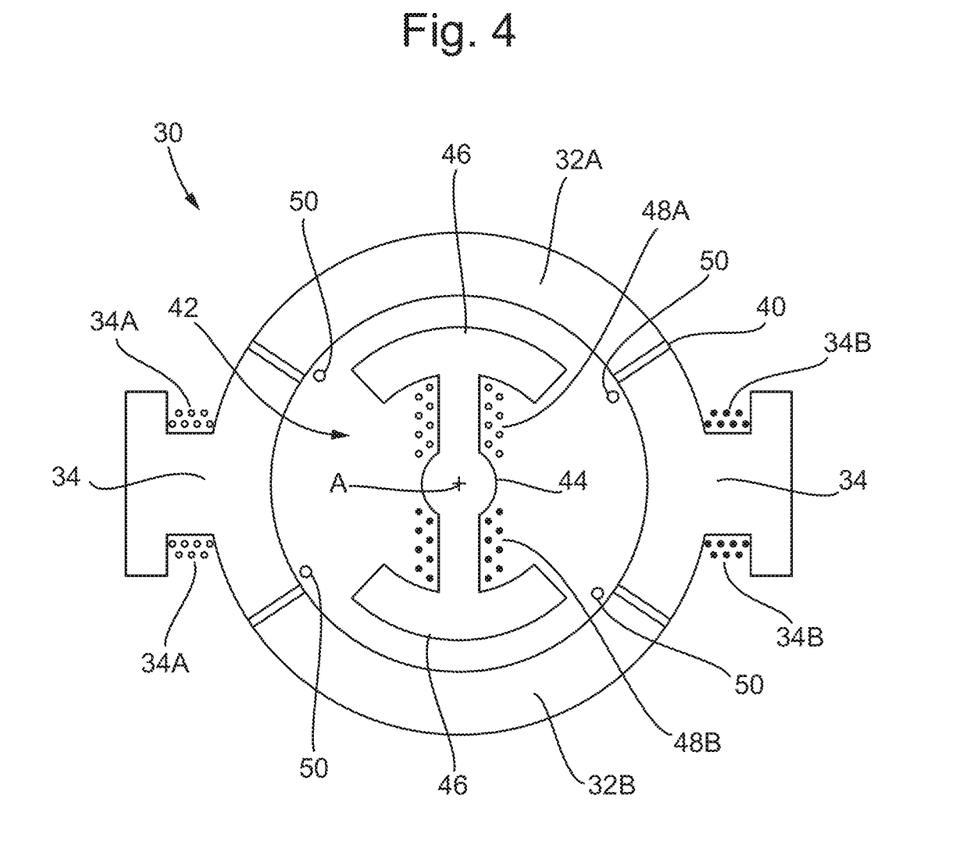
FIG. 4 schematically shows an electric motor in accordance with various embodiments of the present disclosure, and which may be used with the propeller engine of FIG. 3.

FIG. 4 schematically shows one embodiment of an electric motor 30 (or electric motor system) of the present disclosure, which may be used in the engine 16 shown in FIGS. 2 and 3 and elsewhere. The electric motor 30 comprises a rotating portion 40 (or rotor) and a static portion 42 (or stator).

The electric motor 30 comprises a plurality of permanent magnets 32, including a first permanent magnet 32A and a second permanent magnet 32B. The first permanent magnet 32A may be a 'north seeking' magnet, whilst the second permanent magnet 32B may be a 'south seeking' magnet. In the illustrated arrangement the permanent magnets 32 are configured to rotate (e.g., with the propeller hub 20) with the rotating portion 40 about a central axis A.

The electric motor 30 further comprises an alternator 34 made up of a pair of alternator windings 34A, 34B that are wound around respective poles 35, which may be made from any suitable magnetic material such as iron (e.g., iron sheet metal or iron plates). In this arrangement the alternator 34 is configured to rotate with the permanent magnets 32 as part of the rotating portion 40 of the electric motor 30. Although a pair of alternator windings 34A, 34B are shown, any number of windings may be used and the disclosure is not limited to the use of two windings.

The alternator windings 34A, 34B and permanent magnets 32 may be distributed around the circumference of the rotating portion 40, and may be imbricated (e.g., rotate about a common axis such as the central axis A).

The alternator 34 and/or alternator windings 34A, 34B may be configured to generate electricity, which may be used to power one or more electrically powered and/or electro-mechanical systems 24, such as variable pitch 26 and/or deicing systems 28 or any other electrical system located on the rotating portion 40.

Positioning the permanent magnets 32 and alternator 34 as part of the rotating portion 40 removes the requirement to transfer electricity from the static portion 42 of the motor 30 via electrical connections such as brushes and slip rings, as well as hydraulic connections for powering components or one or more electrically powered and/or electro-mechanical systems associated with the rotating portion 40, such as variable pitch and/or deicing systems or any other electrical system.

The static portion 42 of the electric motor 30 comprises a hub (or shaft) 44, extending from which may be opposed magnetic elements 46 (i.e., extending in opposite directions), wherein a plurality of windings 48A, 48B are wound around each magnetic element 46.

The number of windings (two are shown in FIG. 4, namely 48A, 48B) on the static portion 42 may be varied as necessary. For example, as is typical the number of windings may relate to the number of phases of the electric motor, such as 6 windings for a 3 phase motor. The static portion 42 may be positioned in the centre of the motor, and may be attached to a structure (e.g., engine 16) that may be, in turn, attached to or integral with a fixed wing of an aircraft (e.g., wing 14).

The permanent magnets 32 may comprise alternating north and south poles located around the circumference of the rotating portion 40 (relative to axis A). The rotating portion 40 may be installed in the engine 16 of FIG. 3, and could be installed into the propeller hub 20 or the main body of the engine 16 itself, as shown in FIG. 3. In any case, the permanent magnets 32 are rotating with the propellers 18 of the engine 16.

The alternator 34 comprises the alternator windings 34A, 34B distributed about the circumference (relative to axis A), wherein the number of windings of the alternator 34 may be a multiple of the number of phases of the alternator, such as 3 phase alternator that would have 6 windings.

The electric motor 30 may further comprise various position sensors 50 configured to produce signals indicative of the position of one or more of the components of the rotating portion 40, for example the permanent magnets 32 and/or the alternator 34. The controller 100 may receive the signals and may be configured to determine the relative positions of the components of the rotating portion 40 and the static portion 42. This can assist the controller 102 in sending appropriate electrical signals to the windings 48A, 48B of the motor 30. The position sensors 50 may be positioned on the static portion 42 so that the signal transmission to the controller 100 is simplified. Although they may be positioned on the rotating portion 40 this can make it more difficult to communicate with the controller 100.

As shown in the illustrated embodiment the permanent magnets 32 and the alternator 34 are imbricated and share the same rotational axis A. In various embodiments the permanent magnets 32 and the alternator 34 could be axially displaced, while still using a common static portion 42 as a driving element. Both of these embodiments could be referred to as a radial magnetic flux arrangement. In various embodiments the structural elements described herein could be used with an axial magnetic flux arrangement. In this case the permanent magnets 32 and the alternator 34 could be imbricated or concentric, wherein the alternator windings 34A, 34B could be installed on an inner circumference inside an outer circumference of permanent magnets, which could maximise electric motor torque.

The controller 100 may operate similar to a conventional control for a brushless DC motor (e.g., as described above with respect to FIG. 1) to provide commutation switching for the windings 48A, 48B of the static portion 42 so as to generate a torque on the rotating portion 40 and cause rotation of the rotating portion 40 about the axis A.

To achieve this the controller 100 may apply a first, transient and/or variable DC voltage (e.g., from power source 102) to the windings 48A, 48B of the static portion 42, which transient or variable DC voltage is applied to the windings 48A, 48B sequentially in order to generate north or south seeking magnetic fields for driving the rotating portion 40. The controller 100 may apply the transient or variable DC voltage in a trapezoidal, sinusoidal or field-oriented control scheme, as discussed above. The controller may be configured to position the fields with an adequate offset in order to generate the appropriate magnetic forces to rotate the rotating portion 40.

The transient or variable DC voltage is intended to result in generating north and south seeking poles on the windings 48A, 48B of the static portion 42 that are stationary as compared to the permanent magnets 32, regardless of the speed of rotation of the motor 30. In this manner, the controller 100 may be configured to vary the motor torque by varying the DC current applied to the windings 48A, 48B and, in turn, vary the rotational speed of the propellers 18.

The controller 100 may be configured to apply a second, static (or constant) DC voltage to the windings 48A, 48B so as to generate a constant north or south seeking magnetic field on each winding 48A, 48B. These constant magnetic fields may be configured to add or subtract to the fields generated by application of the transient or varying DC voltage described above. The magnetic fields generated by the static DC voltage will be rotating as compared to the rotating portion 40 and alternator 34, resulting in a variable magnetic flux as seen by the windings 34A, 34B, which induces an electric current in these windings 34A, 34B (i.e., of the alternator 34) so as to generate an AC voltage in the alternator 34. The AC voltage will be proportional to the DC voltage applied to the windings 48A, 48B of the static portion 42, and may additionally be influenced by a function of the number of phases and/or poles and RPM of the rotating portion 40 (and, e.g., the propellers 18 thereof).

A single or multiple phase AC voltage generated in the alternator 34 may then be rectified to DC. Current and/or voltage sensor(s) (not shown) may be used to feedback signals representative of the AC or DC current and/or voltage to the controller 100 (located on static portion 42), allowing a closed loop regulation of the produced voltage/current with electrical power demand. This can be achieved via control of the second, static (or constant) DC voltage applied to the magnetic coils of the stator (signal transmission solution described hereinafter).

As such in various embodiments the controller 100 may be configured to regulate the first, static DC voltage supplied to the coils with the demand for electrical power from the alternator 34, optionally using one or more sensors that are configured to produce signals representative of the AC or DC current and/or voltage produced by the alternator 34. This provides the beneficial closed loop regulation as discussed above.

It has been recognised that there is a large ratio between the power needed to drive the rotation of the propellers 18, and the electrical power needed for the electrically powered and/or electro-mechanical systems 24 (e.g., variable pitch mechanism 26 and/or deicing system 28) on the rotating parts of the engine 16. This led to the development of the first and second DC voltages as described above, which allows the motor 30 to provide both electrical power to the electrically powered and/or electro-mechanical systems 24 as well as rotational drive to the engine 16 in an energy efficient manner.

In various embodiments the magnetic coupling between the rotating portion 40 and the non-rotating portion 42 may be used to transmit wireless signals between the rotating and nonrotating parts of the engine 16 (in both directions), for example using high frequency AC modulation. The engine 16 may comprise a magnetic coupling (using, e.g., the windings 34A, 34B of the alternator 34 and the windings 48A, 48B of the static portion 42) between the static portion 40 and the non-rotating portion 42, wherein the magnetic coupling is configured to communicate one or more signals (which may be the wireless signals referred to above) between the static portion 40 and the non-rotating portion 42. The controller 100 may be configured to send and receive these signals via the magnetic coupling to one or more electrically powered systems that are located on the non-rotating portion 42. Similarly, the one or more electrically powered systems may be configured to send and receive signals via the magnetic coupling to the controller 100. The controller 100 and the one or more electrically powered systems may communicate via the magnetic coupling.

In a mode of operation the controller may be further configured to generate electrical power in the alternator windings by applying an AC voltage on the stator windings, but without commutation switching or other variability that would drive the rotor for rotation. This mode of operation can be useful in order to change the pitch on the propellers if the rotor is not rotating, such as when the aircraft is grounded.

As will be appreciated the present technology eliminates the need for an electrical power supply or hydraulic supply lines between the rotating and static or non-rotating portions of a propeller engine, that would otherwise be necessary to provide deicing and variable pitch propellers. There is also a weight and cost reduction due to the electric motor 30 having a common static portion 42 that is used to drive both and alternator 34 and the rotating portion 40 of the motor 30.

Although the present disclosure has been described with reference to various embodiments, it will be understood by those skilled in the art that various changes in form and detail may be made without departing from the scope of the invention as set forth in the accompanying claims.

The invention claimed is:

1. A system comprising:
 a brushless DC ("BLDC") electric motor for a propeller engine, the motor comprising:
  a rotor including one or more permanent magnets and one or more alternator windings; and
  a stator including one or more stator windings; and
 a controller configured to apply a first, transient DC voltage to the one or more stator windings, wherein the first, transient DC voltage is configured to provide commutation switching for the windings of the stator so as to generate a torque on the rotor,
 wherein the controller is further configured to apply a second, static DC voltage to the one or more stator windings, wherein the second, static DC voltage is configured to induce an electric current in the alternator windings so as to generate an AC voltage in the alternator windings.

2. The system as claimed in claim 1, wherein the alternator windings and permanent magnets are distributed around a circumference of the rotor and rotate about a common axis.

3. The system as claimed in claim 1, wherein the stator comprises a hub and magnetic elements extending from the hub, wherein the stator windings are wound around each magnetic element.

4. A system as claimed in claim 3, wherein each magnetic element extends from the hub in an opposing direction to another magnetic element.

5. The system as claimed in claim 1, wherein the permanent magnets comprise alternating north and south poles located around the circumference of the rotor.

6. The system as claimed in claim 1, wherein the alternator windings are located circumferentially between two or more of the permanent magnets of the rotor.

7. The system as claimed in claim 1, wherein the alternator windings are located concentrically within the permanent magnets of the rotor.

8. The system as claimed in claim 1, further comprising one or more position sensors configured to produce signals indicative of the position of the permanent magnets or the alternator windings.

9. A system as claimed in claim 8, wherein the controller is configured to receive the signals from the position sensors and process these signals to determine the relative positions of the one or more stator windings and the permanent magnets or the alternator windings.

10. The system as claimed in claim 1, wherein the permanent magnets and the alternator are axially displaced.

11. A propeller engine comprising:
 a system as claimed in claim 1,
 wherein the motor is configured to drive the engine.

12. A propeller engine as claimed in claim 11, further comprising a rotating portion comprising the rotor and a plurality of propellers, and a non-rotating portion comprising the stator, wherein the rotating portion of the engine further comprises one or more electrically powered systems.

13. A propeller engine as claimed in claim 12, wherein the one or more electrically powered systems comprise one or more of a system for varying a pitch of the propellers and/or system for deicing the propellers and/or any other system.

14. An aircraft comprising:
 one or more propeller engines,
 wherein, at least one of the propeller engines includes a system as claimed in claim 1, wherein the motor is configured to drive the engine the at least one propeller propeller engine.

* * * * *